United States Patent [19]

Day

[11] 4,113,307
[45] Sep. 12, 1978

[54] TRAVEL INSERT CHAIR AND METHOD OF TRANSPORTING THE PHYSICALLY HANDICAPPED

[76] Inventor: Frederick L. Day, Rte. 2, Box 78, Ladson, S.C. 29456

[21] Appl. No.: 800,434

[22] Filed: May 25, 1977

Related U.S. Application Data

[63] Continuation-in-part of Ser. No. 680,766, Apr. 27, 1976.

[51] Int. Cl.² .................................................. A47C 15/00
[52] U.S. Cl. .................................. 297/232; 280/650; 297/183; 297/DIG. 4
[58] Field of Search ............... 5/81 R, 81 B; 108/133; 248/188.6, 439; 280/47.18, 47.2, 47.24, 47.25, 47.38, 47.4, 650; 296/20; 297/51, 55, 58, 59, 130, 133, 183, 232, 355, 363, 364, 417, DIG. 4

[56] References Cited

U.S. PATENT DOCUMENTS

| | | | |
|---|---|---|---|
| 1,044,879 | 11/1912 | Fye | 248/188.6 |
| 1,759,878 | 5/1930 | Zizzo | 248/439 X |
| 2,312,602 | 3/1943 | Taylor | 297/DIG. 4 |
| 2,592,702 | 4/1952 | Sprung | 297/417 |
| 3,057,670 | 10/1962 | Russo | 108/132 X |
| 3,061,365 | 10/1962 | Frieberg | 297/183 X |
| 3,215,469 | 11/1965 | Wamsley | 297/355 X |
| 3,618,968 | 11/1971 | Greer | 297/DIG. 4 X |
| 3,881,773 | 5/1975 | Rodaway | 297/DIG. 4 X |
| 3,889,963 | 6/1975 | Brattgard | 297/DIG. 4 X |
| 4,022,414 | 5/1977 | Egger | 248/188.6 |

*Primary Examiner*—James C. Mitchell
*Attorney, Agent, or Firm*—Bacon & Thomas

[57] ABSTRACT

A method and apparatus for transporting the physically handicapped in the form of an insert travel chair, including a pair of pivoting wheels at the front thereof and the rear portion under the seat being unobstructed whereby the chair may be nested onto the seat of a conventional chair. The chair includes roller means attached to the rear of the seat portion and a pair of handles which can be adjustably pivoted upwardly whereby the chair can be easily manipulated and slid down an emergency evacuation chute or other incline on the front wheels, the roller means attached to the rear of the seat and the handles extending rearwardly and outwardly to provide multiple points of contact with the chute or incline.

19 Claims, 12 Drawing Figures

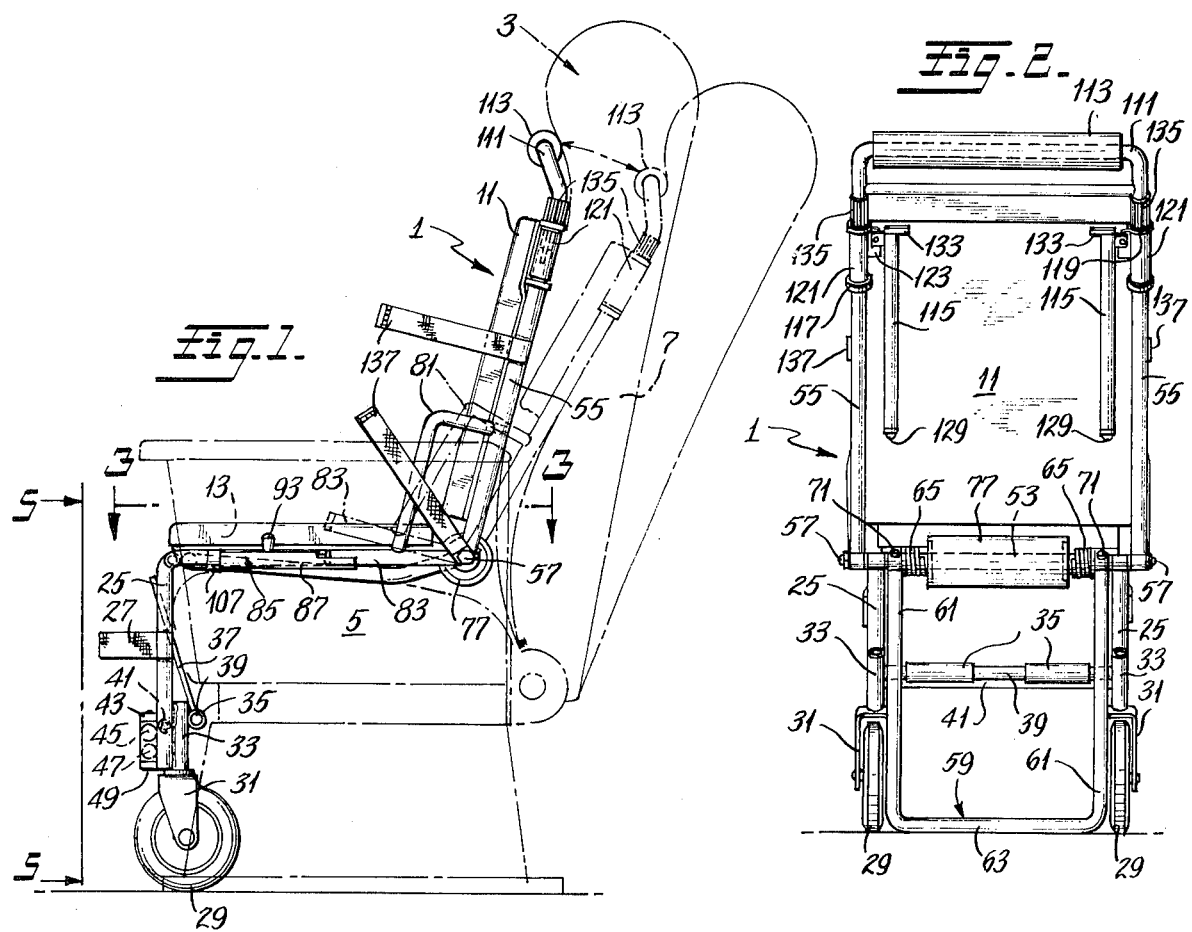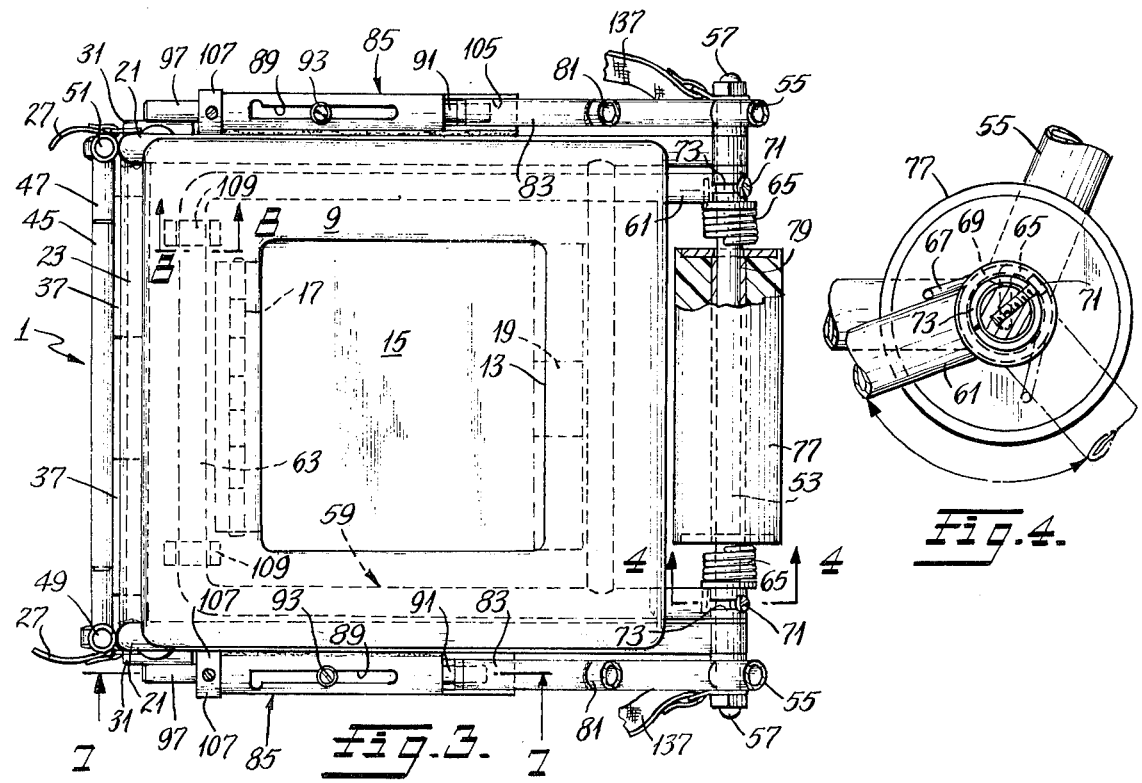

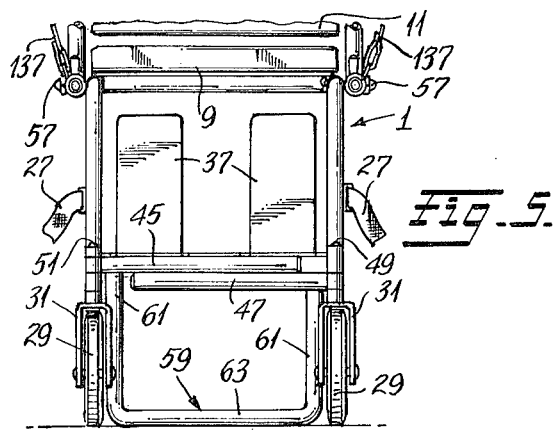
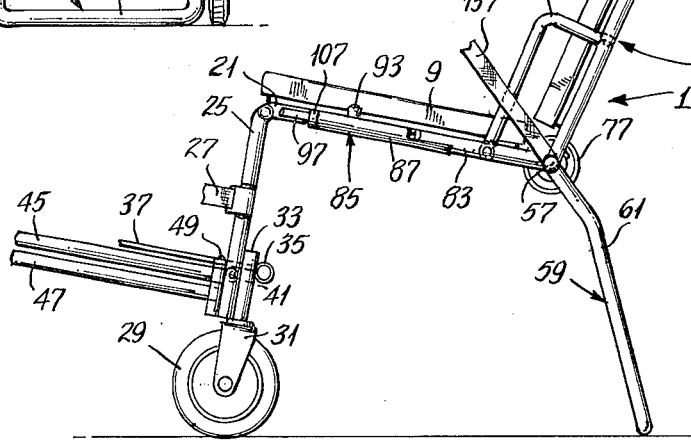
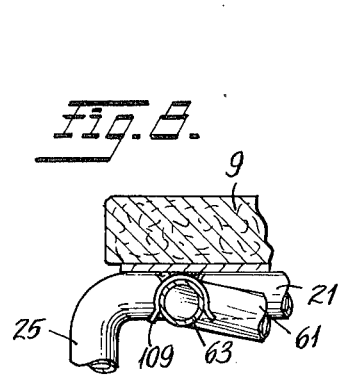
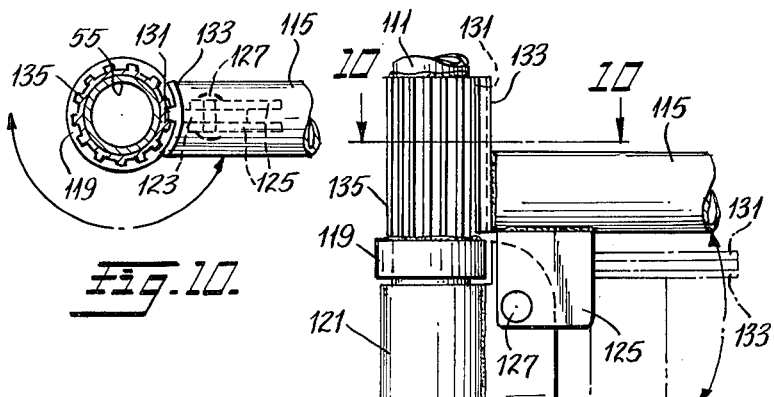
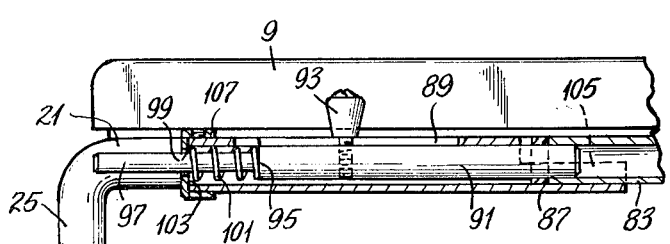
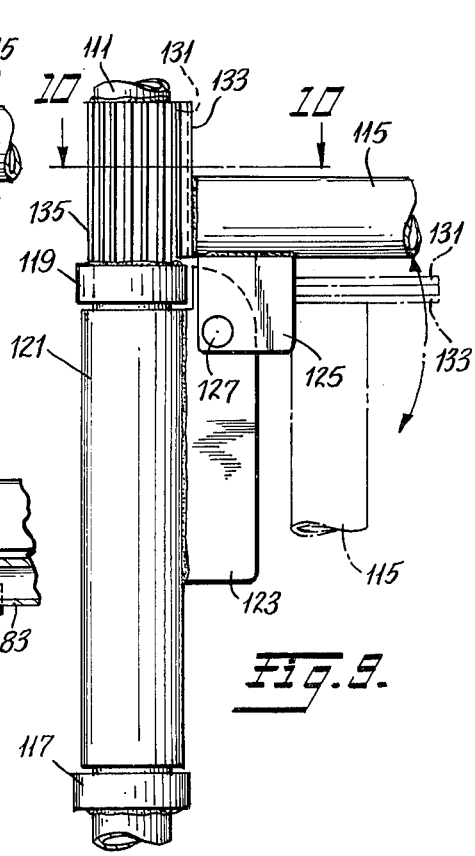

TRAVEL INSERT CHAIR AND METHOD OF TRANSPORTING THE PHYSICALLY HANDICAPPED

CROSS REFERENCE

This is a continuation-in-part of my previously filed application Ser. No. 680,766, filed Apr. 27, 1976.

BACKGROUND OF THE INVENTION

1. Field of the Invention

The invention relates generally to means for permitting a wheelchair confined person ease in transportation, and more particularly to an insert travel chair which may be placed within a conventional conveyance or public facility seat and having means for facilitating evacuation of a person from the conveyance or public facility.

2. Prior Art

Normally it is necessary for an individual who is confined to a wheelchair or who has other difficulties in walking to be transferred from, for example, a vehicle to a conventional wheelchair, and then taken to his seat on an airplane, bus, train or other conveyance or to a seat in a theater or other public facility. It is then necessary to transfer the individual from the wheelchair into the conveyance or facility seat. When it is time to leave, the reverse operation is followed.

The above procedure obviously provides a considerable amount of inconvenience and often requires two attendants. Further, in the event of an emergency exit, it is even more difficult, time consuming and dangerous.

One prior art device which is illustrated in U.S. Pat. No. 3,889,963 includes two sets of wheels so that the wheelchair can function as a conventional wheelchair. Because of the rigid chair design and the non-pivoting relationship of the wheels and back shown in this prior art patent, it would be virtually impossible to maneuver the chair in an aisle and to pivot the back to conform with the back of the conventional chair in which it is inserted. Furthermore, it would be extremely difficult to evacuate a person in the chair shown in the patent.

U.S. Pat. No. 2,328,047 illustrates a stretcher which can be converted into a chair movable in the form of a handtruck. There is no means in this prior art patented device to permit the chair to be self-supporting or maneuver in an aisle, and it would be much more dangerous to evacuate a person, for example, down a chute.

In applicant's prior application referred to above, the Examiner further cited U.S. Pat. Nos. 2,282,270; 3,337,261; 3,883,175; 3,376,067 and 3,829,159 to illustrate various features shown and/or claimed in the previous application.

OBJECTS AND SUMMARY OF THE INVENTION

It is an object of the instant invention to alleviate the need for transferring an individual as has been previously done.

Another object is to provide a means for permitting a handicapped individual to remain in the same seat throughout a trip on a plane, train or other public conveyance. It is also an object to permit a handicapped individual to remain in the same seat while at a concert, movie, or in any other public facility, without the need of transferring the individual.

A further object is to provide means for lifting a person in the chair.

Another object is to provide means for evacuating a person from an aircraft down an evacuation chute while remaining in the insert chair.

Still another object is to provide a travel insert chair which can be maneuvered by a single attendant down an aisle, into a seat and in and out of a lavatory.

The above objects are accomplished by providing a travel chair which may be inserted or nested within almost any conventional public facilities seat. Specifically, the unit includes a seat which is wide enough to accommodate the individual, but narrow enough to fit into the normal public facilities seat. The insert travel chair includes a seat, a back and a pair of front rests. A pair of wheels are connected to the front of the seat, and rear leg means are designed to fold up under the seat. The rear of the seat which is free from any obstructions includes roller means to facilitate sliding the chair over the seat, as well as a pair of rearwardly and upwardly extending arms having rollers on the ends thereof, which, together with the roller means on the rear of the seat and the front wheels provide a pair of three point contacts with a chute for evacuation purposes.

BRIEF DESCRIPTION OF THE DRAWINGS

The above and other objects of the invention and advantages thereof will be understood from the following description when read in conjunction with the accompanying drawings wherein:

FIG. 1 is a side elevational view of the insert travel chair of the present invention resting within the confines of a conventional seat of a public conveyance, the conveyance seat thereof being shown in phantom lines together with an adjusted position of the back of the seat for the purpose of illustration;

FIG. 2 is a rear elevational view of the travel seat of FIG. 1 removed from the conveyance seat and being supported by the front wheels and the folding rear leg means thereof;

FIG. 3 is an enlarged fragmentary plan view of the travel seat, taken on the line 3—3 of FIG. 1;

FIG. 4 is a fragmentary vertical sectional view, taken on the line 4—4 of FIG. 3, showing the actuating mechanism for the folding rear leg means;

FIG. 5 is a fragmentary front elevational view of the travel chair of FIG. 1, taken on the line 5—5 thereof;

FIG. 6 is a side elevational view of the travel chair of FIG. 2 as viewed from the left thereof;

FIG. 7 is an enlarged fragmentary vertical sectional view, taken on the line 7—7 of FIG. 3 showing the latching mechanism for locking the chair seat to its back;

FIG. 8 is an enlarged fragmentary vertical sectional view, taken on the line 8—8 of FIG. 3, showing the retainer for locking the folding rear leg in its inoperative position;

FIG. 9 is an enlarged fragmentary elevational view of one of the rear lifting handles;

FIG. 10 is a fragmentary horizontal sectional view taken on the line 10—10 of FIG. 9;

DETAILED DESCRIPTION OF THE INVENTION

Figure 11:
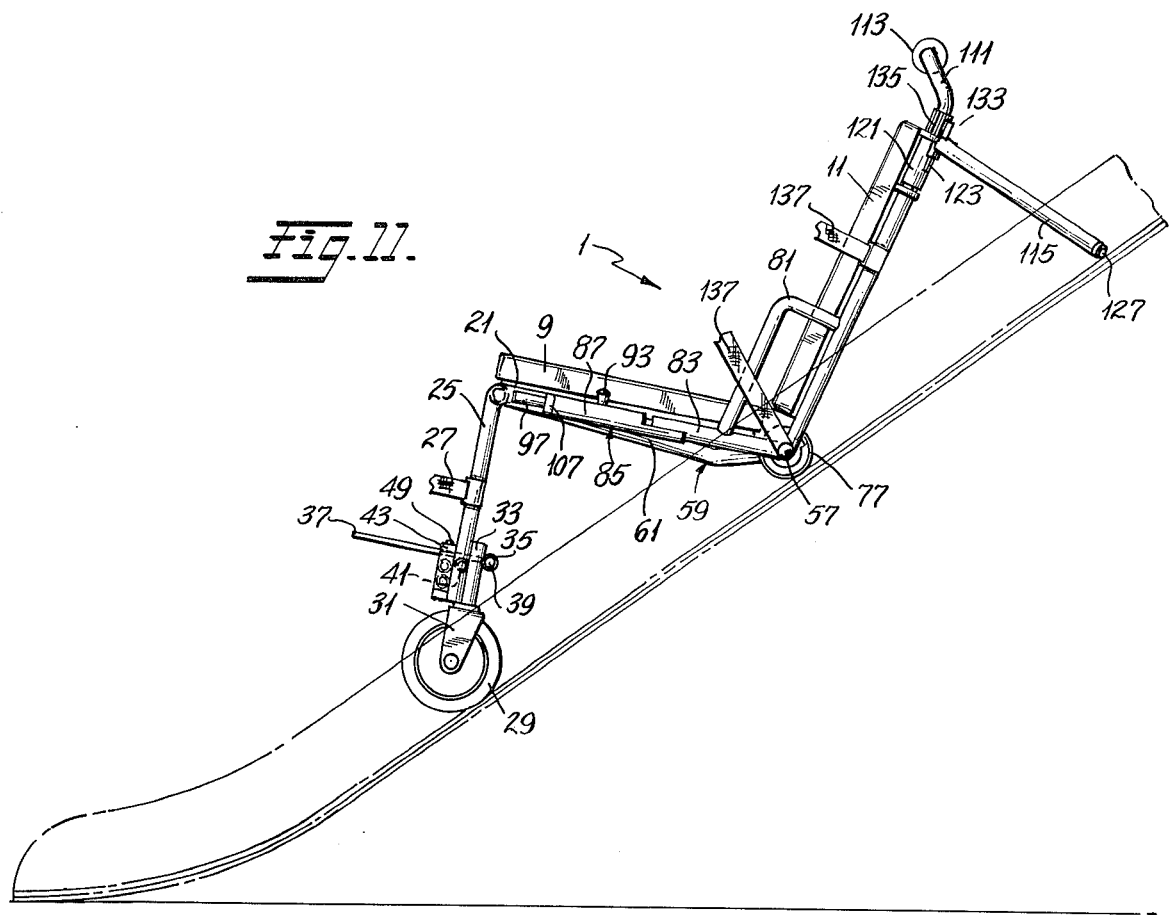
FIG. 11 is a diagrammatic side elevational view of the insert travel chair associated with an escape chute of an aircraft.

Referring to FIG. 1, an insert chair 1 is seen positioned into a conventional airline seat 3 having a seat portion 5 and a pivoted back portion 7.

The chair 1 has, as seen in FIGS. 1, 2, and 6 a seat 9 and a back 11, both made of conventional cushioned material which are positioned onto a frame of the chair 1 which will be discussed in detail below.

The seat 9 as seen in FIG. 3 includes an opening 13 therein. A seat insert 15 is positioned within the opening 13 and pivots around a hinge 17. Attached to the insert 15 is a magnet which cooperates with another magnet positioned on the base of the seat 9. This is broadly seen as 19. Thus, the magnets 19 will hold the insert in the closed position; however, it may be pushed or pulled downwardly about hinge 17 so that the unit may be positioned over a toilet without having the occupant transferred out of the unit onto the toilet. This particular feature will be further discussed below.

The seat 9 is positioned on a pair of forwardly extending seat frame members 21 which are joined together at the forward end by a transverse member 23. A pair of downwardly extending members 25 seen in FIGS. 1, 2, and 6 support a pair of straps 27 which may be joined together to retain the legs of the occupant. Also attached to the members 25 are a pair of castor wheels 29 which pivot in frames 31 having a vertical member extending into and pivotable within a journal or bracket 33. The wheel structure is generally the same as the front wheel castors on most wheelchairs and include the shaft rotatable in the bracket 33 so that the wheel 29 may pivot a complete 360° so that the chair can easily be moved at any angle and can be pushed down a main aisle and then into a side aisle for positioning the chair within a conventional seat.

Figure 12:
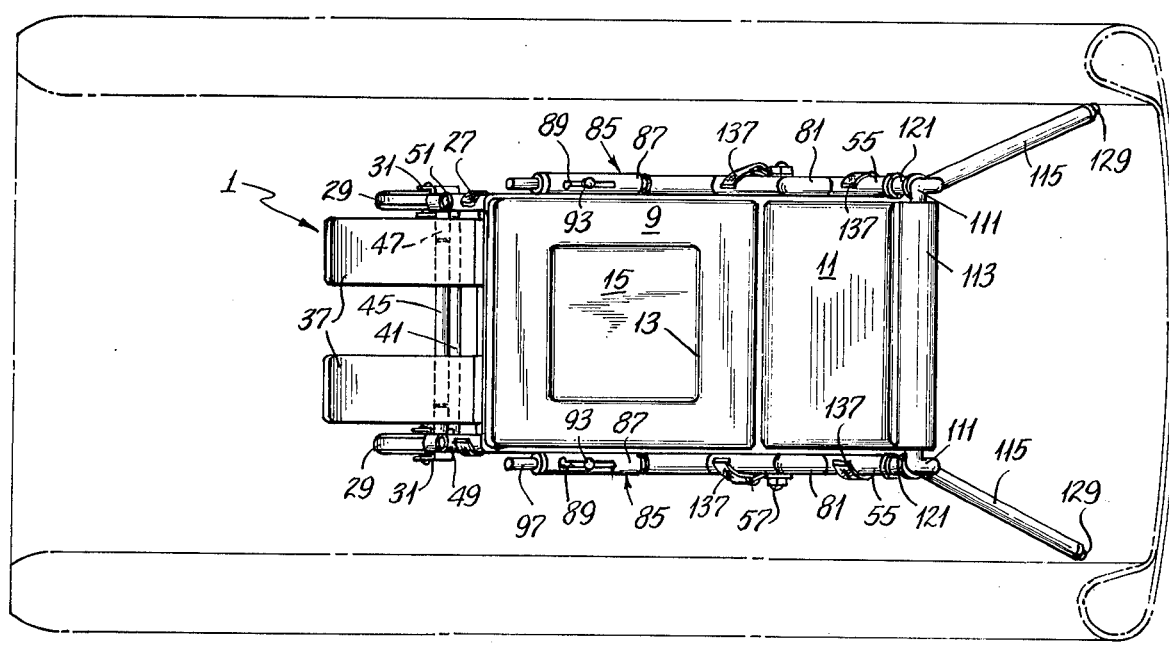
FIG. 12 is a diagrammatic plan view of the chair of FIG. 11.

Attached to the bracket 33 is another bushing 35 having a pair of footrests 37 pivoted therein on a shaft 39. A stop member 41 as best seen in FIG. 12 limits the distance the footrest 37 can extend downwardly. When the chair is inserted into a conventional seat as seen in FIG. 1, the footrests may be pivoted upwardly and the occupant's feet can rest on the floor.

Also attached to the downwardly extending members 25 are a pair of brackets 43 which have upper and lower pivoting arms 45 and 47, respectively, journaled therein on shafts 49 and 51, respectively. These pivoted handles are used in cooperation with other handles on the back of the chair to be discussed below for lifting the individual while in the chair.

A transverse bar or rod 53 extends between parallel members 21 and includes a pair of upstanding back support members 55 pivoted thereon. As will be seen below various other members are pivoted on the bar 53 which includes a pair of acorn nuts 57 secured to each end thereof.

Also pivoted on bar 53 is a spring-biased kick leg means 59 including a pair of downwardly extending members 61 and a bight member 63. The elements 61 and 63 can be formed from a single U-shaped bent tube.

The various pivotal connections on rod 53 can be accomplished by means of brackets attached to members pivoted thereon. Obviously, bushings can be inserted in each bracket to facilitate the pivoting action.

The members 61 of the leg means include, as seen in FIGS. 3 and 4, a pair of springs 65 which include a first portion 67 biased against the members 61 and a second end portion 69 anchored into a hole in the rod 53. A pair of screws 71 are threaded into rod 53 and rotate in slots 73 in member 61. The slots define the limits that the members 61 can rotate as seen in FIG. 4.

A roller 77 having a sleeve 79 is rotatably mounted on the rod 53 for assisting in inserting the chair into the conventional seat and for other purposes which will be seen below.

A pair of armrests 81 are secured to the back frame members 55 and connected to a forwardly projecting element 83 which is tubular and which cooperates with a latch mechanism 85 as seen in detail in FIG. 7. The latch includes a tubular element 87 having a slot 89 therein. A bolt 91 having a handle 93 threaded thereto slides in tubular member 87 with the handle 93 extending through the slot 89. The bolt 91 has a shoulder 95 with a reduced portion 97 extending outwardly from an opening 99. A spring 101 cooperating with the shoulder 95 and a rear portion 103 biases the front portion of bolt 91 into engagement with tubular member 83. When it is desired to pivot the back rearwardly, the bolt is pulled forward, disengaging element 83 from a slot 105 in the top of tubular member 87, thus permitting the back to move rearwardly to conform with the reclining of the conventional seat as seen in phantom lines in FIG. 1. A bracket 107 holds the latch onto the frame as seen in FIG. 3. This also provides the rear closure element and shoulder 103.

As seen in FIG. 8 and in dotted form in FIG. 3, a pair of clips 109 are positioned on the bottom of the seat 9 to retain the bight 63 of the U-shaped leg member in an upward position.

A U-shaped member 111 with a headrest 113 journaled thereon is connected to the upstanding back frame elements 55.

Referring now to FIGS. 6, 9 and 10, a pair of swinging and pivotable handles 115 are secured to the back frame elements 55. Each frame element 55 has a lower collar 117 and an upper collar 119 non-rotatably secured thereto. Between the collars is positioned a rotating sleeve 121 which has a plate 123 welded thereto. The handles 115 have a pair of depending plate members 125 welded thereto and are coupled to plate 123 by means of a plurality of pins 127. Handles 115 each have a roller mechanism 129 secured to one end thereof and a key or spline 131 secured to the other by means of a curved element 133. Spline 131 cooperates with a circular toothed element 135 secured to frame member 155.

Numerals 137 illustrate seat and chest belts.

As will be seen in FIGS. 6, 9 and 10 each of the handles 115 can be pivoted downwardly about pins 127 disengaging spline 131 from the toothed element 135 (FIG. 9). Once the handles are in the disengaged position as seen in dotted lines in FIG. 9, it can be rotated on sleeve 121 to any position as seen by the arrow in FIG. 10. One position is seen in the top plan view of FIG. 12 for emergency evacuation from a plane as will be discussed below, and another position is seen in the rear view of FIG. 2. When the handles are in the rearward position, they can be used to push the unit, or when cooperating with handles or arms 45 and 47, the unit can be picked up and moved by two people with the occupant therein. When the handles are in the 180° position as seen by the arrow in FIG. 10 where the handles would in effect be toward the front of the chair, the individual in the chair can be pushed into the seat or onto a toilet seat once the roller 77 has been put on the edge of the chair or toilet seat. This will be discussed in some further detail below.

USING THE UNIT

A typical operation or utilization of the device will be seen from the description set out below.

If one assumes that an individual is arriving by car at an airport, the person can be moved from the car into the travel insert chair. The leg means 59 would be in the floor engaging position as seen in FIGS. 2 and 6. The footrests 37 are pivoted from the position seen in FIGS. 1 and 5 to the position seen in FIG. 6. To move the individual, the leg means 59 will be raised to engage element 63 in clips 109 as seen in FIGS. 3 and 8. It will be appreciated that when the leg means are moved to the non-ground engaging position, this will be facilitated by the springs 65 which are an over-center type spring so that once the leg element is moved past the center towards the non-ground engaging position it will be forced upwardly into engagement with clips 109. The handles 115 will have been raised to the position seen in FIG. 6 by engaging the spline 131 with the toothed member 135 wherein the arms are substantially directly rearwardly. The individual can be moved by one person to a seat, or alternatively, since the chair is about 16 inches in width, it can be inserted into another wheelchair, and the individual can propel himself around the airport.

When the unit is placed in a chair, the arms 115 will be dropped downwardly and rotated to the position seen in FIG. 2 so that they will not obstruct the insertion of the chair into another seat.

When it is desired to have the individual board the airplane, he can be wheeled with his feet on the footrests 37 and with the leg means in the retracted, non-ground engaging position either directly onto the plane or to the stairway leading up to the plane. If there is a stairway involved, then two individuals can lift the unit, one lifting handles 115 and the other lifting the arms 45 and 47 adjacent the wheels, which arms have been pivoted from the retracted position seen in FIGS. 3 and 5 to the extended positions seen in FIG. 6. Thus, the individual can be either carried directly onto the plane or a step at a time with the wheels 29 engaging the steps.

When the unit has reached the plane level, the arms 45 and 47 can be moved to their retracted position as seen in FIGS. 3 and 5. The unit can then be pushed down the aisle to the assigned seat. Because of the width of the unit and particularly because of the pivoting wheels 29, it is possible to roll the unit into the seat aisle either sideways or straight in and then pivot the unit. It will be appreciated that the handles 115 can be rotated to any position to assist in the manipulation of the individual. For example, when the roller 77 is placed against the edge of the seat, the arms 115 can be rotated 180° from the rear to the front so as to push the chair back onto the seat.

If it is necessary for the individual to use the lavatory on the plane, the same procedure can be used with the aid of the rotating handles 115 so as to manipulate the individual onto the toilet with the seat insert 15 in the open position. The roller 77 is placed on the edge of the toilet seat and the unit is pushed rearwardly with the handles 115 in the forward position. Again, because the width of the unit is only about 16 inches and the depth is no more than an ordinary seat, it is possible for an attendant to move around the unit.

Upon disembarking from the plane, the reverse procedure is used. However, if it is necessary for an emergency evacuation, the unit can be used as illustrated in FIGS. 11 and 12 wherein the device is seen going down an emergency chute. It will be appreciated that the person will be strapped into the unit by means of straps 27 and 137 with his feet resting on the footrests 37. The rear handles 115 will be extended at an angle as seen in FIG. 12. Thus, there will be at least five points of contact with the chute, namely wheels 29, roller 77, and the rollers 129 on each of the arms 115. By positioning the arms 115 at the angle shown in FIG. 12 it is less likely that the unit will turn over with the occupant therein. Thus, there will be means for one person to assist in the emergency evacuation of an individual without any transferring from one chair to another or without being carried by two people with the many attendant problems of an emergency evacuation.

While the invention has been described, it will be understood that it is capable of further modifications and this application is intended to cover any modifications, uses or adaptations of the invention following in general the principles of the invention and including such departures from the present disclosure as come within known or customary practice in the art to which the invention pertains, and as may be applied to the essential features hereinbefore set forth and as fall within the scope of the invention or limits of the appended claims.

I claim:

1. A method of transporting the physically handicapped to and/or from a conventional seat comprising:
   (a) providing a chair with a seat, attaching wheel means pivotally and rotatably to the front thereof only, the seat being substantially free of obstructions under the rear thereof,
   (b) providing the chair with a back,
   (c) positioning leg means under the rear of the seat in a ground engaging position to form a self-supporting chair,
   (d) positioning a physically handicapped person in the chair,
   (e) pivotally connecting a pair of back handles on said back,
   (f) pivoting said back handles from a substantially vertical position to a substantially horizontal position to extend rearwardly of said back,
   (g) moving said legs means to a non-ground engaging position,
   (h) transporting the person in the chair by rolling the chair on said front wheel means only by pivoting the chair about the wheel means with the person therein and rolling the chair in a pivoted position, the wheels being permitted to pivot whereby the conventional seat may be approached from a variety of angles,
   (i) nesting the chair onto a conventional seat and sliding the rear of the chair seat over the conventional seat, (j) returning said back handles to a substantially vertical position to permit the chair to be substantially fully nested in the conventional seat.

2. The method of claim 1 including moving and adjustably positioning said back handles in a substantially horizontal plane forwardly of said back for facilitating positioning the chair on the conventional seat.

3. The method of claim 1 incorporated in evacuating an aircraft including:

(a) providing an emergency evacuation chute at a door of the aircraft,
(b) pivoting said back handles to a position where said back handles are directed rearwardly from said back and outwardly from the sides of the chair,
(c) positioning the chair on the chute, and sliding the chair down the chute on the wheels, back handles and the point where the back joins the seat.

4. The method of claim 1 including
(a) pivotally connecting a pair of front handles on said front adjacent said wheels, and
(b) pivoting said front handles from a position parallel to the front of the chair to a position perpendicular to the front of the chair and lifting a person in the chair by two people, one lifting by said back handles and the other by said front handles.

5. The method of claim 1 incorporated in positioning the person seated therein onto a toilet comprising:
(a) providing the seat with an insert pivotally connected to the seat on the forward side thereof,
(b) pivoting the insert downward from a position substantially coextensive with the seat to a position substantially vertical thereto,
(c) positioning the seat over the toilet wherein the opening formed by the pivoting of the insert is over the toilet.

6. The method of claim 1 including:
(a) pivotally connecting the back to the seat,
(b) latching the back relative to the seat while transporting the person,
(c) unlatching the back relative to the seat by the occupant and pivoting the back to conform with the position of the back of the conventional seat.

7. An insert travel chair comprising:
(a) a seat having a front and rear,
(b) a back attached to the rear of said seat,
(c) a pair of wheels,
(d) means for pivotally and rotatably attaching said wheels to the front of said seat,
(e) the area under the rear of said seat being substantially unobstructed whereby said seat may be positioned over a conventional seat,
(f) leg means extending downwardly from the rear of said seat, said leg means being movable from a ground engaging position to a non-ground engaging position,
(g) a pair of back handles extending from said back for pivoting the chair to permit movement from place to place,
(h) said pair of back handles being adjustably positioned on said back, means for pivoting said back handles from a substantially vertical position to a substantially horizontal position,
(i) a pair of front handles pivotally connected to the front of the chair adjacent said wheels and movable in a substantially horizontal plane from a position parallel to the front of the chair to a position substantially perpendicular to the front of the chair.

8. An insert travel chair as defined in claim 7, including a pair of footrests pivotally and adjustably connected to said wheel attaching means.

9. An insert travel chair as defined in claim 7, including means for biasing said leg means into a non-ground engaging position.

10. An insert travel chair as defined in claim 7, including clip means on the underside of said seat for receiving and retaining said leg means in a non-ground engaging position.

11. An insert travel chair as defined in claim 7, including means for pivoting said back handles from a position extending rearwardly of said back to a position wherein said back handles extend in a substantially horizontal plane and forwardly of said back.

12. An insert travel chair as defined in claim 7, wherein said pivoting means includes a spline on each of said back handles and a pair of toothed elements positioned on said back cooperating with respective splines whereby said splines may be rotated and engaged in the toothed elements at varying angles.

13. An insert travel chair as defined in claim 7, including roller means positioned in an end of each of said back handles remote from the back.

14. An insert travel chair as defined in claim 7, including an insert having forward and rearward edges pivotally connected to said seat and being substantially coextensive therewith in a closed position, means for pivoting said insert to a second open position, said pivoting means including a hinge on the forward edge thereof.

15. An insert travel chair as defined in claim 15, including means for pivotally attaching said back to said seat, means for latching said back in a position wherein said back may be locked in a non-pivoting position and unlocked into a pivotable position.

16. An insert travel chair as defined in claim 7 including a pair of arms, wherein said arms are connected to said back and are pivotable therewith.

17. An insert travel chair as defined in claim 15, including latching means which includes:
(a) a tubular member connected to said back,
(b) a tubular member connected to said seat,
(c) a bolt movable from a position engaging said tubular member to a position disengaging one of said tubular members.

18. An insert travel chair as defined in claim 15, including roller means positioned at the point where said back and seat are pivotally attached to each other.

19. An insert travel chair as defined in claim 18, including a rod attached to said seat and wherein said back, said roller means and said leg means pivot on said rod.

* * * * *